United States Patent
Epperlein et al.

(10) Patent No.: US 10,493,900 B2
(45) Date of Patent: Dec. 3, 2019

(54) ADAPTIVE HEADLIGHTS FOR THE TRAJECTORY OF A VEHICLE

(71) Applicant: International Business Machines Corporation, Armonk, NY (US)

(72) Inventors: Jonathan P. Epperlein, Phibsborough (IE); Claudio Gambella, Dublin (IE); Yassine Lassoued, Dublin (IE); Jakub Marecek, Dublin (IE); Martin Mevissen, Dublin (IE); Julien Monteil, Dublin (IE); Giovanni Russo, Dublin (IE); Robert Shorten, Dublin (IE); Wynita M. Griggs, Maynooth (IE); Rodrigo H. Ordonez-Hurtado, Maynooth (IE)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/971,200

(22) Filed: May 4, 2018

(65) Prior Publication Data
US 2019/0337443 A1  Nov. 7, 2019

(51) Int. Cl.
*G01C 21/32* (2006.01)
*B60Q 1/14* (2006.01)
(Continued)

(52) U.S. Cl.
CPC ......... *B60Q 1/143* (2013.01); *B60Q 1/0023* (2013.01); *F21S 41/60* (2018.01); *G06K 9/00798* (2013.01); *B60Q 2300/112* (2013.01)

(58) Field of Classification Search
CPC combination set(s) only.
See application file for complete search history.

(56) References Cited

U.S. PATENT DOCUMENTS 5,796,094 A  8/1998  Schofield et al.
6,049,171 A  4/2000  Stam et al.
(Continued)

FOREIGN PATENT DOCUMENTS

CN  103617647 A  3/2014
DE  102009024129 A1  12/2010
(Continued)

OTHER PUBLICATIONS

Antony et al., "Vision Based Vehicle Detection: A Literature Review", International Journal of Applied Engineering Research, vol. 11, No. 5, 2016, ISSN 0973-4562, pp. 3128-3133.
(Continued)

*Primary Examiner* — Masud Ahmed
(74) *Attorney, Agent, or Firm* — Edward J. Wixted, III

(57) ABSTRACT

In an approach for determining the illumination necessary along a vehicle's planned trajectory, a processor receives information relevant to the trajectory of a vehicle. A processor estimates the position of the vehicle at the particular time on the trajectory of the vehicle, using the data from the sensors. A processor estimates an illumination of the trajectory of the vehicle, using the model of the illumination of the road network and the data from the sensors, wherein a threshold is employed. A processor determines the threshold is exceeded. A processor changes a setting of the at least one headlight on the vehicle. A processor determines the threshold is exceeded. A processor alerts the user of the vehicle when adjustments to the at least one headlight that are necessary to illuminate the trajectory of the vehicle exceed physical limitations of the at least one headlight.

20 Claims, 3 Drawing Sheets

(51) Int. Cl.
*B60Q 1/00* (2006.01)
*G06K 9/00* (2006.01)
*F21S 41/60* (2018.01)

(56) References Cited

U.S. PATENT DOCUMENTS

| | | | |
|---|---|---|---|
| 6,281,632 B1 | 8/2001 | Stam et al. | |
| 6,403,942 B1 | 6/2002 | Stam | |
| 6,429,594 B1 | 8/2002 | Stam et al. | |
| 6,587,573 B1 | 7/2003 | Stam et al. | |
| 6,593,698 B2 | 7/2003 | Stam et al. | |
| 6,704,621 B1 | 3/2004 | Stein et al. | |
| 6,728,393 B2 | 4/2004 | Stam et al. | |
| 6,831,261 B2 | 12/2004 | Schofield et al. | |
| 6,882,287 B2 | 4/2005 | Schofield | |
| 7,004,606 B2 | 2/2006 | Schofield | |
| 7,113,867 B1 | 9/2006 | Stein | |
| 7,149,613 B2 | 12/2006 | Stam et al. | |
| 8,064,643 B2 | 11/2011 | Stein et al. | |
| 8,199,198 B2 | 6/2012 | Sun et al. | |
| 8,254,635 B2 | 8/2012 | Stein et al. | |
| 8,373,754 B2 | 2/2013 | Kuehnle et al. | |
| 8,379,088 B2 | 2/2013 | Kuehnle et al. | |
| 8,493,446 B2 | 7/2013 | Li et al. | |
| 8,605,154 B2 | 12/2013 | Datta et al. | |
| 8,636,392 B2 | 1/2014 | Ehlgen et al. | |
| 8,812,226 B2 | 8/2014 | Zeng | |
| 8,917,169 B2 | 12/2014 | Schofield et al. | |
| 8,970,357 B2 | 3/2015 | Usami | |
| 8,993,951 B2 | 3/2015 | Schofield et al. | |
| 8,995,723 B2 | 3/2015 | Stein et al. | |
| 9,008,369 B2 | 4/2015 | Schofield et al. | |
| 9,042,600 B2 | 5/2015 | Endo | |
| 9,092,695 B1 | 7/2015 | Ogale | |
| 9,129,159 B2 | 9/2015 | Cardoso et al. | |
| 9,147,298 B2 * | 9/2015 | Ricci | B60Q 1/00 |
| 9,171,217 B2 | 10/2015 | Pawlicki et al. | |
| 9,191,634 B2 | 11/2015 | Schofield et al. | |
| 9,248,832 B2 | 2/2016 | Huberman | |
| 9,264,626 B2 | 2/2016 | Siecke et al. | |
| 9,404,630 B2 | 8/2016 | Foltin | |
| 9,428,103 B2 | 8/2016 | Foltin | |
| 9,428,192 B2 | 8/2016 | Schofield et al. | |
| 9,436,880 B2 | 9/2016 | Bos et al. | |
| 9,440,535 B2 | 9/2016 | Schofield | |
| 9,452,705 B2 | 9/2016 | Bouffay et al. | |
| 9,469,240 B2 | 10/2016 | Uchida et al. | |
| 9,589,464 B2 | 3/2017 | Rovik et al. | |
| 9,651,390 B1 * | 5/2017 | Thompson | G01C 21/3602 |
| 2002/0080618 A1 | 6/2002 | Kobayashi et al. | |
| 2002/0195949 A1 | 12/2002 | Stam et al. | |
| 2003/0209893 A1 | 11/2003 | Breed et al. | |
| 2004/0114379 A1 * | 6/2004 | Miller | B60Q 1/085 |
| | | | 362/464 |
| 2004/0143380 A1 | 7/2004 | Stam et al. | |
| 2005/0253738 A1 | 11/2005 | Kobayashi et al. | |
| 2007/0052555 A1 | 3/2007 | Ibrahim | |
| 2007/0221822 A1 | 9/2007 | Stein et al. | |
| 2008/0043099 A1 | 2/2008 | Stein et al. | |
| 2008/0044062 A1 | 2/2008 | Stam et al. | |
| 2008/0137908 A1 | 6/2008 | Stein et al. | |
| 2009/0021581 A1 | 1/2009 | Sun et al. | |
| 2010/0157061 A1 | 6/2010 | Katsman et al. | |
| 2010/0172542 A1 | 7/2010 | Stein et al. | |
| 2010/0191391 A1 | 7/2010 | Zeng | |
| 2010/0289632 A1 | 11/2010 | Seder et al. | |
| 2011/0109743 A1 | 5/2011 | Kuehnle et al. | |
| 2011/0109744 A1 | 5/2011 | Kuehnle et al. | |
| 2011/0228089 A1 | 9/2011 | Almeida | |
| 2012/0027255 A1 | 2/2012 | Endo | |
| 2012/0127313 A1 | 5/2012 | Ehlgen | |
| 2012/0287276 A1 | 11/2012 | Dwivedi et al. | |
| 2013/0051618 A1 | 2/2013 | Foltin | |
| 2013/0054089 A1 | 2/2013 | Nordbruch et al. | |
| 2013/0229521 A1 | 9/2013 | Siecke et al. | |
| 2014/0009066 A1 | 1/2014 | Bouffay et al. | |
| 2014/0009617 A1 | 1/2014 | Utagawa et al. | |
| 2014/0306833 A1 * | 10/2014 | Ricci | B60Q 1/00 |
| | | | 340/901 |
| 2014/0309789 A1 * | 10/2014 | Ricci | B60Q 1/00 |
| | | | 700/276 |
| 2014/0309864 A1 * | 10/2014 | Ricci | H04W 4/21 |
| | | | 701/36 |
| 2014/0347872 A1 | 11/2014 | Foltin | |
| 2015/0016128 A1 | 1/2015 | Doerne et al. | |
| 2015/0151670 A1 | 6/2015 | Uchida et al. | |
| 2015/0210275 A1 | 7/2015 | Huberman | |
| 2016/0375821 A1 | 12/2016 | Schofield | |

FOREIGN PATENT DOCUMENTS

| | | |
|---|---|---|
| DE | 102009057391 A1 | 12/2010 |
| DE | 102009054227 A1 | 5/2011 |
| DE | 102011081394 B3 | 10/2012 |
| DE | 102012001017 A1 | 7/2013 |
| DE | 102014221883 A1 | 4/2016 |
| EP | 2383679 A1 | 11/2011 |
| EP | 2383713 A1 | 11/2011 |
| EP | 2682899 A3 | 3/2015 |
| WO | 2011015625 A1 | 2/2011 |

OTHER PUBLICATIONS

Mukhtar et al., "Vehicle Detection Techniques for Collision Avoidance Systems: A Review", IEEE Transactions on Intelligent Transportation Systems, vol. 16, Issue 5, Oct. 2015, pp. 2318-2338.

Luo et al., "A Comprehensive Survey of Vision Based Vehicle Intelligent Front Light System", International Journal on Smart Sensing and Intelligent Systems, vol. 7, No. 2, Jun. 2014, pp. 701-723.

Park et al., "Augmented Reality and Representation in Vehicle for Safe Driving at Night", International Conference on Information and Communication Technology Convergence (ICTC), Jeju, South Korea, Oct. 28-30, 2015, 3 pages.

Asaduzzaman et al., "Automatic High Beam Controller for Vehicles", International Journal of Scientific & Engineering Research, vol. 4, Issue 3, Mar. 2013, ISSN 2229-5518, 5 pages.

"HBC (High Beam Control)", Mazda: HBC Active Safety Technology, Last Printed Dec. 1, 2017, 3 pages, <http"//www.mazda.com/en/innovation/technology/safety/active_safety/hbc>.

"Performance and safety refined", Model S Tesla, Printed Dec. 1, 2017, 8 pages, <https://www.tesla.com/models>.

"Cornering Light", Cornering Light<Technical Glossary<Innovation & Technology<Volkswagen International, Printed Dec. 1, 2017, 10 pages, <http://en.volkswagen/en/innovation-and-technology/technical-glossary/kurvenfahrlicht.html>.

"Hudway—increasing driver safety in low visibility conditions (rain, fog, heavy snow or darkness)" Printed Apr. 19, 2018, 8 pages, <http://hudwayapp.com/>.

Chan et al., "Automatic Headlamp Switching System Using Accelerometers", Proceedings of the International Conference on Computer Vision Theory and Applications, Angers, France,May 17-21, 2010, vol. 1, pp. 488-491.

* cited by examiner

ADAPTIVE HEADLIGHTS FOR THE TRAJECTORY OF A VEHICLE

BACKGROUND

The present invention relates generally to the field of illumination, and more particularly to determining the illumination necessary along a vehicle's planned trajectory.

Illumination is affected by light, which includes controllable light sources (e.g., in-vehicle lamps), non-controllable artificial light sources (e.g., public lighting), and non-controllable natural light sources (e.g., the sun). Proper illumination enhances driver performance, improves road traffic safety, and has positive psychological effects on occupants.

We henceforth refer to non-controllable artificial light sources, collectively, as streetlights. We refer to non-controllable natural light sources, collectively, as ambient light.

SUMMARY

Aspects of an embodiment of the present invention disclose a method, computer program product, and computing system for determining the illumination necessary along a vehicle's planned trajectory. A processor receives information relevant to the trajectory of a vehicle. A processor estimates the position of the vehicle at the particular time on the trajectory of the vehicle, using the data from the sensors. A processor estimates an illumination of the trajectory of the vehicle, using the model of the illumination of the road network and the data from the sensors, wherein a threshold is employed. A processor determines the threshold is exceeded. A processor changes a setting of the at least one headlight on the vehicle. A processor determines the threshold is exceeded. A processor alerts the user of the vehicle when adjustments to the at least one headlight that are necessary to illuminate the trajectory of the vehicle exceed physical limitations of the at least one headlight.

DETAILED DESCRIPTION

Embodiments of the present invention recognize that an aid to night vision capabilities, especially in rural settings, are extremely important. Embodiments of the present invention recognize that in moving towards the future, headlights will be increasingly more of an aid for humans in the driver's seat of a vehicle, in addition to self-driving vehicles that rely on lidar components. For example, the self-driving vehicle on a country road with no illumination needs to have the headlights on full blast to look out for animals, such as rabbits and deer, as well as other cars, trees, and houses. Furthermore, when turning into a hedge-lined road, the headlights would need to be reduced markedly. Even further, when turning into a well-lit village, the headlights may not be needed, except to alert others of the presence of the vehicle—as the headlights may shine into people's bedrooms, etc.

Embodiments of the present invention suggest the use of camera, lidar, and differential GPS data to keep track of a vehicle's position along a trajectory and within a map of illumination, with the vehicle knowing/estimating when the driver will keep straight, turn, etc. Embodiments of the present invention disclose an approach for determining the illumination necessary for a vehicle's planned trajectory.

Embodiments of the present invention will now be described in detail with reference to the Figures.

Figure 1:
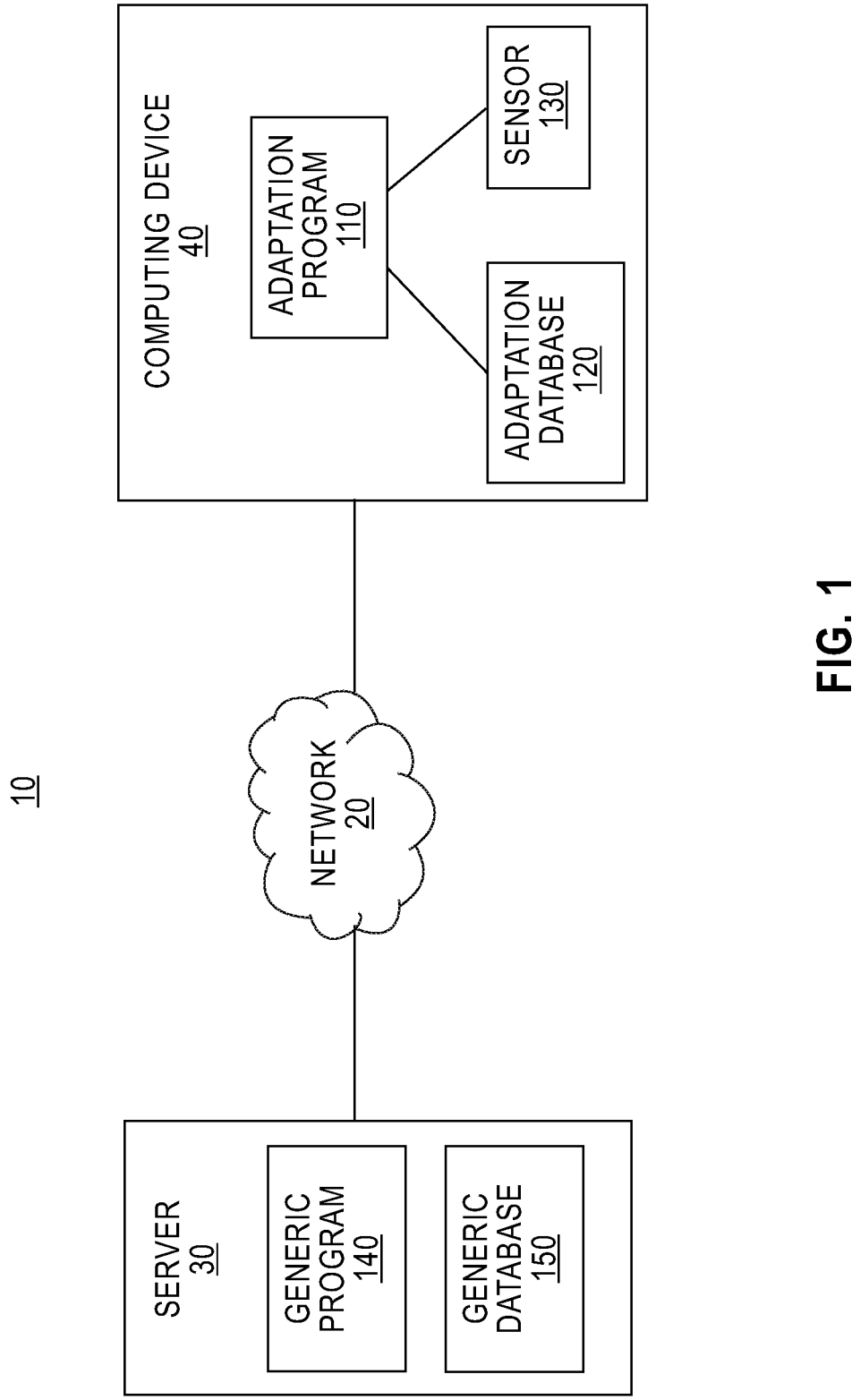
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains generic program 140 and generic database 150. In other embodiments, server 30 may include generic program 140, generic database 150, and/or other components, as depicted and described in further detail with respect to FIG. 3.

Computing device 40 may be an embedded device (e.g., an in-vehicle chip or chipset), an on-board computer (e.g., the navigation system of the car), personal device (e.g., mobile phone or smartphone), desktop computer, laptop computer, netbook computer, or tablet computer. In general, computing device 40 may be any electronic device or computing system capable of processing program instructions, sending and receiving data, and communicating with other devices over a network. In the depicted embodiment, computing device 40 contains adaptation program 110, adaptation database 120, and sensor 130. In other embodiments, computing device 40 may include adaptation program 110, adaptation database 120, sensor 130, and/or other components, as depicted and described in further detail with respect to FIG. 3.

Adaptation program 110 determines the illumination necessary for a vehicle's planned trajectory. In doing so, adaptation program 110 receives information relevant to the trajectory of a vehicle. Adaptation program 110 estimates the position of the vehicle. Adaptation program 110 estimates the illumination of the trajectory of the vehicle.

Adaptation program 110 determines there is not enough light and changes the settings of the headlights on the vehicle. Adaptation program 110 determines there is not enough light and alerts the driver of the vehicle. In some embodiments, adaptation program 110 uses a control device (not shown) to complete the steps of the present invention. In the depicted embodiment, adaptation program 110 resides on computing device 40. In other embodiments, adaptation program 110 may reside on another computing device, server 30, or another server, provided that adaptation program 110 can access adaptation database 120, sensor 130, generic program 140, and generic database 150.

Adaptation database 120 may be a repository that may be written to and/or read by adaptation program 110. In some embodiments, adaptation program 110 may retrieve data for street lighting of a particular street and store the data to adaptation database 120. In other embodiments, adaptation database 120 may store information about geographical features, such as, landmarks and trees. In the depicted embodiment, adaptation database 120 resides on computing device 40. In other embodiments, adaptation database 120 may reside on another computing device, server 30, or another server, provided that adaptation database 120 is accessible to adaptation program 110.

Sensor 130 may be any device capable of detecting events or changes in an environment and providing a corresponding output. There may be multiple sensors within the present invention. In one embodiment, sensor 130 may provide a corresponding output of a change in position to adaptation program 110. Examples of sensor 130 may be, but are not limited to: near field communication (NFC) devices, radio-frequency identification (RFID) tags, Bluetooth® devices, accelerometers, gyroscopes, visible light/infrared cameras, lidar devices, and/or geo-positioning. In some embodiments, sensors, such as sensor 130 may be embedded within computing device 40. In other embodiments, sensors, such as sensor 130 may be operably affixed to a vehicle. For example, a sensor may be operably affixed (either internally or externally) to the vehicle. Such an arrangement may allow for each sensor (e.g., sensor 130) to detect other vehicles, street signs, and streetlights on/near the trajectory of the vehicle. In the depicted embodiment, sensor 130 resides on computing device 40. In other embodiments, sensor 130 may reside on another computing device or another server, provided that sensor 130 is accessible to adaptation program 110.

Generic program 140 may be any program on server 30 that may be accessed by adaptation program 110 over network 20. For example, generic program 140 may be an application or program that is designed to obtain information concerning various weather activities, seasonal information, such as sunrise and/or sunset times, and street lighting for various areas. Adaptation program 110 may use current information gathered by generic program 140 to obtain precise, current, or future lighting for a particular path. In the depicted embodiment, generic program 140 resides on server 30. In other embodiments, generic program 140 may reside on another server or another computing device, provided that generic program 140 is accessible to adaptation program 110.

Generic database 150 may be any database on server 30 that may be accessed by adaptation 110 over network 20. For example, generic database 150 may be a repository that stores prior, or current, street lighting pattern information obtained by a program or application. Adaptation program 110 may use archived information stored to generic database 150 to obtain historical weather pattern information. In the depicted embodiment, generic database 150 resides on server 30. In other embodiments, generic database 150 may reside on another server or another computing device, provided that generic database 150 is accessible to adaptation program 110.

Figure 2:
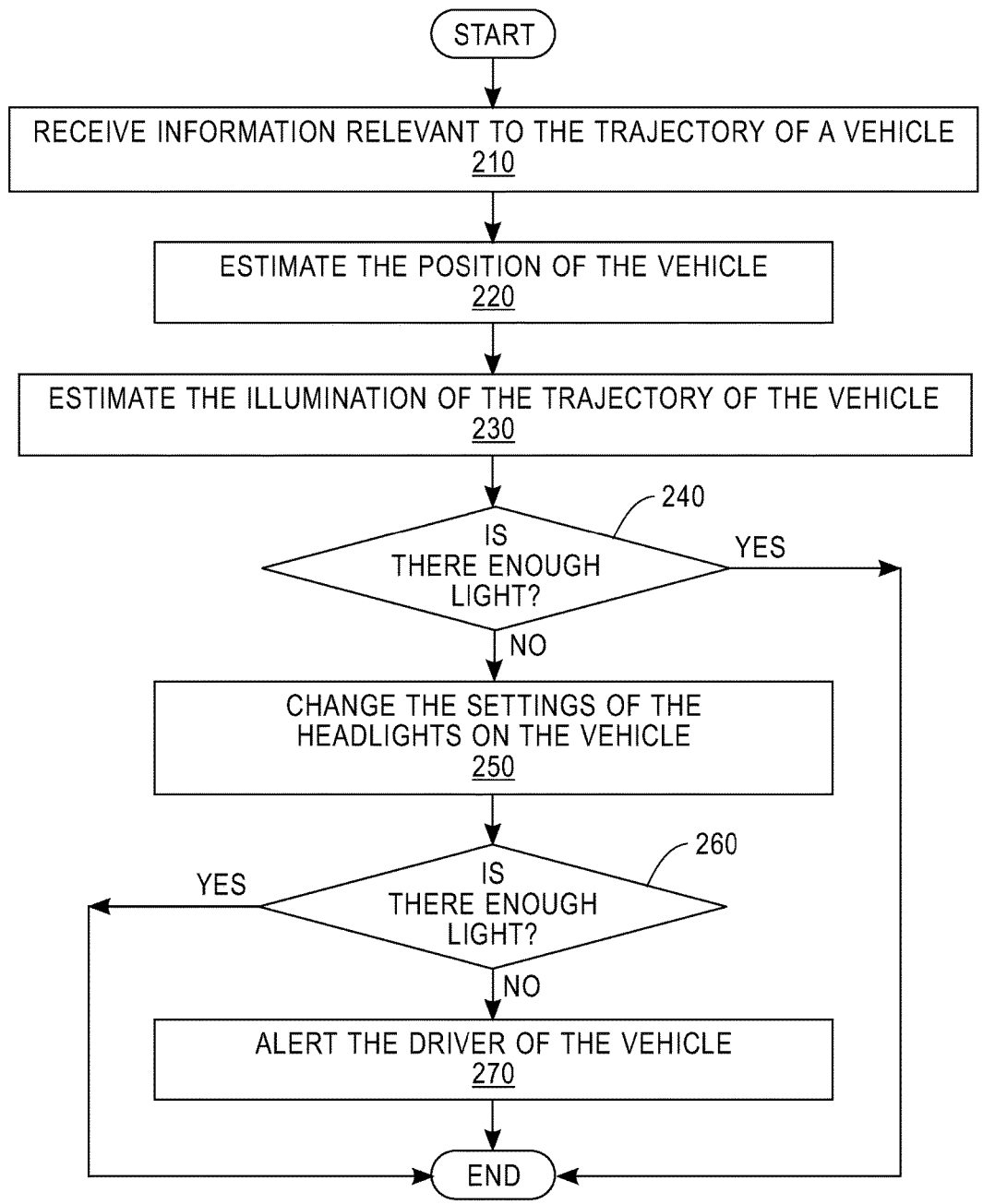
FIG. 2 depicts a flowchart of the steps of an adaptation program, executing within the computing system of FIG. 1, for determining the illumination necessary along a vehicle's planned trajectory.

FIG. 2 depicts a flowchart of the steps of an adaptation program, executing within the computing system of FIG. 1, in accordance with an embodiment of the present invention. Adaptation program 110 determines the illumination necessary for a vehicle's planned trajectory.

In step 210, adaptation program 110 receives information relevant to the trajectory of a vehicle. Information relevant to the trajectory of the vehicle includes, but is not limited to: a planned path of the driver of the vehicle; the position and trajectory of the vehicle at a particular time; a map of the road network; a model of the illumination of the road network; a model of the terrain; and/or points of interest (e.g., landmarks, buildings, streetlights, and street signs). Additional information relevant to the trajectory of the vehicle includes data from each sensor, such as sensor 130, (e.g., camera, lidar, infrared, positioning, visibility, etc.).

In one embodiment, adaptation program 110 receives information relevant to the trajectory of the vehicle from sensor 130. In other embodiments, adaptation program 110 receives information relevant to the trajectory of the vehicle from generic program 140. In some embodiments, adaptation program 110 retrieves information relevant to the trajectory of the vehicle from adaptation database 120 and/or generic database 150.

In step 220, adaptation program 110 estimates the position of the vehicle. In some embodiments, at time t, the trajectory of the vehicle is $p=( \ldots, p(t-1), p(t), p(t+1), \ldots )$. In one embodiment, adaptation program 110 estimates the position, $P(t)$, of the vehicle using data from sensor 130. Retrieving information relevant to the trajectory of the vehicle (e.g., the speed limit, the speed of the vehicle, and the position at a particular moment in time) from sensor 130, adaptation program 110 estimates the position of the vehicle at any particular moment in time on the particular trajectory.

In step 230, adaptation program 110 estimates the illumination of the trajectory of the vehicle. In some embodiments, the model of illumination is used to determine the amount of luminous flux, $S(t+1)$, $S(t+2)$, ..., produced by the streetlights and the amount of ambient light, $A(t+1)$, $A(t+2)$, ..., down from $proj(P(t), p)$ along the planned trajectory, p, at the appropriate time, $t+1, t+2, \ldots$, of the day. The model of illumination and sensor data are used to obtain a threshold, $T(t)$, for the combined luminous flux.

In decision 240, adaptation program 110 determines whether there is enough light. Adaptation program 110 determines whether there is enough light by assessing whether the threshold for combined luminous flux of the headlights, the streetlights, and the ambient light at a given time of day has been exceeded. In one embodiment, the threshold is determined by a user. In other embodiments, the threshold is determined by adaptation program 110. If adaptation program 110 determines there is enough light, adaptation program 110 ends. On the other hand, if adaptation program 110 determines there is not enough light, then adaptation program 110 changes the settings of the headlights on the vehicle (step 250).

In step 250, adaptation program 110 changes the settings of the headlights on the vehicle. In one embodiment, adaptation program 110 alerts the driver to the illumination ahead of the trajectory of the vehicle and to change the settings of the headlights to a particular setting to provide sufficient lighting. In other embodiments, adaptation program 110 automatically changes the settings of the headlights, causing the headlights to emit a different amount of light than before. The luminous flux of the headlights, H(t+1), H(t+2), ..., is adjusted as H(i)i:=T(i)−A(i)−S(i). In some embodiments, adaptation program 110 changes the settings of the headlights, giving the driver the option to accept the changes or reject to the changes. If the driver accepts the changes, then adaptation program 110 causes the headlights to emit a different amount of light than before. If the driver rejects the changes, then the headlights continue to emit the same amount of light as before. Still, in other embodiments, adaptation program 110 automatically changes the settings of the headlights, causing the headlights to emit a different amount of light than before. In this embodiment, the driver is given the option to accept the changes or reject the changes and causing the headlights to go back to the previous setting and previous amount of light being emitted. In some embodiments, adaptation program 110 alerts the driver of a safe reduction of speed, due to changing illumination.

The emitted light may change in a number of ways. For example, adaptation program 110 can use a mechanism to cause a shade, or other obscuring device, to move in front of the headlight and away from the headlight as less or more light is required. By way of another example, there could be multiple bulbs of various illuminous strengths within each headlight (i.e., headlamp) of the vehicle, and adaptation program 110 can manipulate one or more bulbs to emit the proper amount of light. By way of another example, there could be one bulb in each headlight of the vehicle, and adaptation program 110 can manipulate the one bulb to emit the proper amount of light.

In some embodiments, adaptation program 110 loops around step 210 through step 250 until a predetermined time and/or action takes place. Examples of the predetermined action may be, but are not limited to: turning onto a different street, stopping at a red light, and turning off the ignition of the vehicle.

In decision 260, adaptation program 110 determines whether there is enough light. Adaptation program 110 determines whether there is enough light by assessing whether the threshold for combined luminous flux of the headlights, the streetlights, and the ambient light at a given time of day has been exceeded. In one embodiment, the threshold is determined by a user. In other embodiments, the threshold is determined by adaptation program 110. If adaptation program 110 determines there is enough light, adaptation program 110 ends. On the other hand, if adaptation program 110 determines there is not enough light, then adaptation program 110 alerts the driver of the vehicle (step 270).

In step 270, adaptation program 110 alerts the driver of the vehicle. In one embodiment, adaptation program 110 alerts the driver of the vehicle when adjustments to the headlights that are necessary to illuminate the trajectory of the vehicle exceed the physical limitations of the headlights. In this embodiment, the light from natural (i.e., ambient) light and artificial light, coupled with the light from the headlights, is not enough to sufficiently illuminate the trajectory of the vehicle and does not meet the needs given by factors, including: cognitive abilities of the driver, abilities of any possible auto-pilot, insurance policies, and atmospheric conditions.

In other embodiments, adaptation program 110 reduces the speed of the vehicle while alerting the driver when adaptation program 110 detects that the combined luminous flux of the headlights, streetlights, and ambient light does not meet the needs given by factors, including: cognitive abilities of the driver, abilities of any possible auto-pilot, insurance policies, and atmospheric conditions. In some embodiments, adaptation program 110 alerts the driver when the sensors, such as sensor 130, other than the visible light cameras detect obstacles that may not be apparent in the given factors, including: the combined luminous flux of the headlights, the streetlights, the ambient light, the cognitive abilities of the driver, and the atmospheric conditions. Still, in other embodiments, adaptation program 110 alerts the driver of any sudden changes in the luminous flux of the headlights and provides an explanation to the driver as to why adaptation program 110 made the sudden change to the luminous flux of the headlights.

Figure 3:
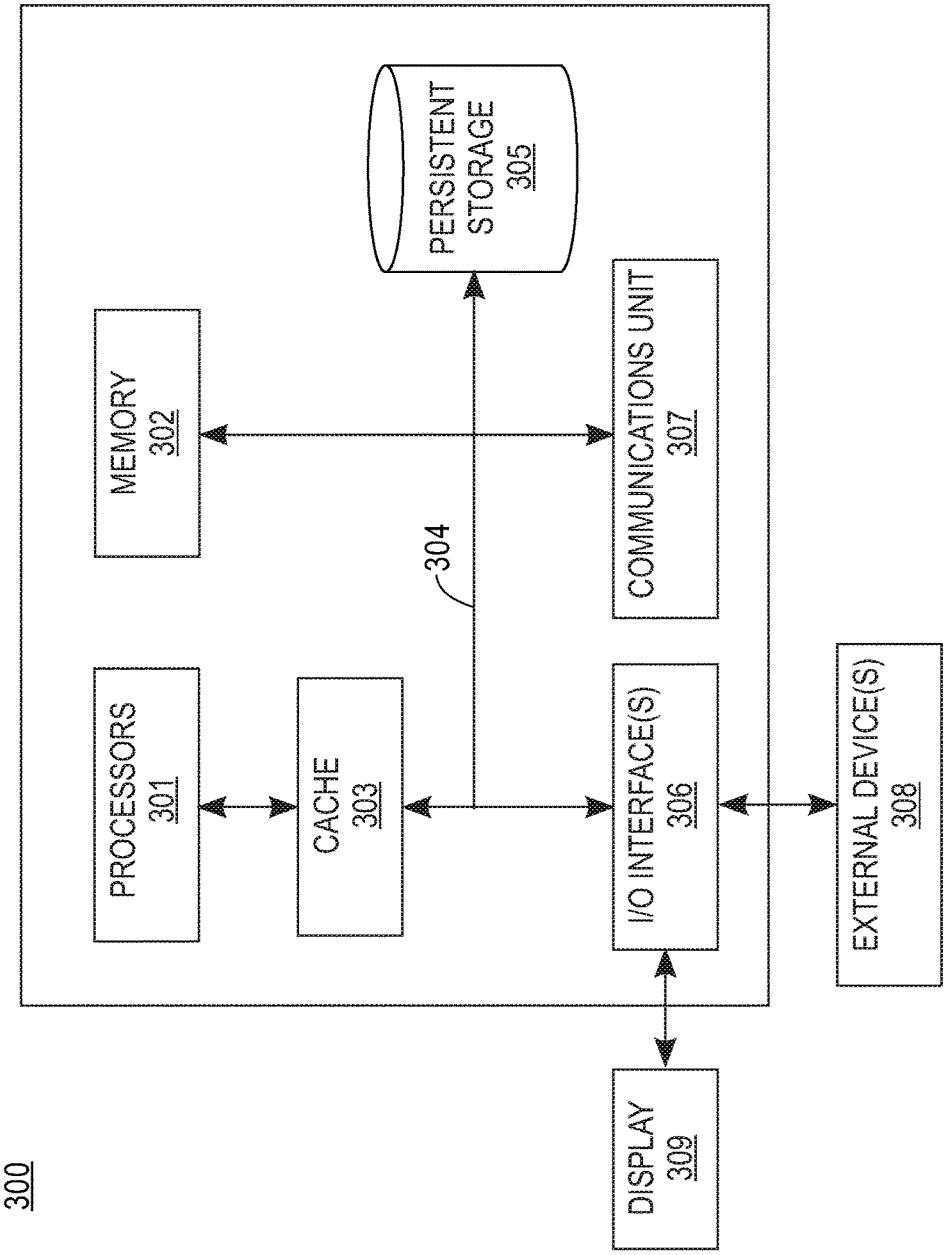
FIG. 3 depicts a block diagram of components of the server and/or the computing devices of FIG. 1, in accordance with an embodiment of the present invention.

FIG. 3 depicts computer system 300, which is an example of a system that includes components of server 30 and/or computing device 40. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Generic program 140 and generic database 150 may be downloaded to persistent storage 305 of server 30 through communications unit 307 of server 30. Adaptation program 110, adaptation database 120, and sensor 130 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., generic program 140 and generic database 150, can be stored on such portable computer readable storage media and can be loaded onto persistent storage 305 of server 30 via I/O interface(s) 306 of server 30. Software and data used to practice embodiments of the present invention, e.g., adaptation program 110, adaptation database 120, and sensor 130, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    receiving, by one or more processors, information relevant to the trajectory of a vehicle, wherein the information relevant to the trajectory of the vehicle includes: a planned path of a user of the vehicle, a position and trajectory of the vehicle at a particular time, a map of a road network, a model of an illumination of the road network, a model of a terrain, and data from sensors;
    estimating, by one or more processors, the position of the vehicle at the particular time on the trajectory of the vehicle, using the data from the sensors;
    estimating, by one or more processors, an illumination of the trajectory of the vehicle, using the model of the illumination of the road network and the data from the sensors, wherein a threshold is employed for combined luminous flux of at least one headlight, streetlight, and ambient light at the particular time;
    determining, by one or more processors, the threshold is exceeded, wherein the exceeded threshold reveals there is not enough light present from the combined luminous flux of the at least one headlight, the streetlight, and the ambient light at the particular time;
    changing, by one or more processors, a setting of the at least one headlight on the vehicle;
    subsequent to changing the setting of the at least one headlight on the vehicle, determining, by one or more processors, the threshold is exceeded; and
    alerting, by one or more processors, the user of the vehicle when adjustments to the at least one headlight that are necessary to illuminate the trajectory of the vehicle exceed physical limitations of the at least one headlight, wherein the combined luminous flux of the at least one headlight, the streetlights, and the ambient light is not enough to illuminate the trajectory of the vehicle at the particular time.

2. The method of claim 1, wherein the sensors are selected from the group consisting of: visible light cameras, infrared cameras, lidar systems onboard the vehicle imaging a scene ahead of the vehicle, and geo-positioning systems.

3. The method of claim 1, further comprising:
    alerting, by one or more processors, the user of an illumination ahead of the trajectory of the vehicle;
    recommending, by one or more processors, to the user to change the setting of the at least one headlight to a determined setting to provide lighting necessary to illuminate the trajectory of the vehicle;
    receiving, by one or more processors, an indication that the user rejects the recommendation; and
    emitting, by one or more processors, through the at least one headlight, a same amount of light as before the recommendation.

4. The method of claim 1, further comprising:
    alerting, by one or more processors, the user of a sudden change of luminous flux of the at least one headlight; and
    providing, by one or more processors, an explanation, to the user, of a reason for the sudden change of the luminous flux of the at least one headlight.

5. The method of claim 1, wherein alerting the user of the vehicle comprises:
    alerting, by one or more processors, the user when the combined luminous flux of the at least one headlight, the streetlights, and the ambient light does not meet the needs given by cognitive abilities of the user, abilities of any possible auto-pilot, insurance policies, and atmospheric conditions.

6. The method of claim 5, further comprising:
    reducing, by one or more processors, a speed of the vehicle.

7. The method of claim 1, wherein alerting the user of the vehicle comprises:
    alerting, by one or more processors, the user when the sensors detect obstacles that may not be apparent in the combined luminous flux of the at least one headlight, the streetlight, the ambient light, cognitive abilities of the user, and atmospheric conditions.

8. A computer program product comprising:
    one or more computer readable storage media and program instructions stored on the one or more computer readable storage media, the program instructions comprising:
    program instructions to receive information relevant to the trajectory of a vehicle, wherein the information relevant to the trajectory of the vehicle includes: a planned path of a user of the vehicle, a position and trajectory of the vehicle at a particular time, a map of a road network, a model of an illumination of the road network, a model of a terrain, and data from sensors;
    program instructions to estimate the position of the vehicle at the particular time on the trajectory of the vehicle, using the data from the sensors;

program instructions to estimate an illumination of the trajectory of the vehicle, using the model of the illumination of the road network and the data from the sensors, wherein a threshold is employed for combined luminous flux of at least one headlight, streetlight, and ambient light at the particular time;

program instructions to determine the threshold is exceeded, wherein the exceeded threshold reveals there is not enough light present from the combined luminous flux of the at least one headlight, the streetlight, and the ambient light at the particular time;

program instructions to change a setting of the at least one headlight on the vehicle;

subsequent to changing the setting of the at least one headlight on the vehicle, program instructions to determine the threshold is exceeded; and program instructions to alert the user of the vehicle when adjustments to the at least one headlight that are necessary to illuminate the trajectory of the vehicle exceed physical limitations of the at least one headlight, wherein the combined luminous flux of the at least one headlight, the streetlights, and the ambient light is not enough to illuminate the trajectory of the vehicle at the particular time.

9. The computer program product of claim 8, wherein the sensors are selected from the group consisting of: visible light cameras, infrared cameras, lidar systems onboard the vehicle imaging a scene ahead of the vehicle, and geo-positioning systems.

10. The computer program product of claim 8, further comprising:
program instructions, stored on the one or more computer readable storage devices, to alert the user of an illumination ahead of the trajectory of the vehicle;
program instructions, stored on the one or more computer readable storage devices, to recommend to the user to change the setting of the at least one headlight to a determined setting to provide lighting necessary to illuminate the trajectory of the vehicle;
program instructions, stored on the one or more computer readable storage devices, to receive an indication that the user rejects the recommendation; and
program instructions, stored on the one or more computer readable storage devices, to emit through the at least one headlight, a same amount of light as before the recommendation.

11. The computer program product of claim 8, further comprising:
program instructions, stored on the one or more computer readable storage devices, to alert the user of a sudden change of luminous flux of the at least one headlight; and
program instructions, stored on the one or more computer readable storage devices, to provide an explanation, to the user, of a reason for the sudden change of the luminous flux of the at least one headlight.

12. The computer program product of claim 8, wherein program instructions to alert the user of the vehicle comprise:
program instructions to alert the user when the combined luminous flux of the at least one headlight, the streetlights, and the ambient light does not meet the needs given by cognitive abilities of the user, abilities of any possible auto-pilot, insurance policies, and atmospheric conditions.

13. The computer program product of claim 12, further comprising:
program instructions, stored on the one or more computer readable storage devices, to reduce a speed of the vehicle.

14. The computer program product of claim 8, wherein program instructions to alert the user of the vehicle comprise:
program instructions to alert the user when the sensors detect obstacles that may not be apparent in the combined luminous flux of the at least one headlight, the streetlight, the ambient light, cognitive abilities of the user, and atmospheric conditions.

15. A computer system comprising:
one or more computer processors, one or more computer readable storage media, and program instructions stored on the one or more computer readable storage media for execution by at least one of the one or more computer processors, the program instructions comprising:
program instructions to receive information relevant to the trajectory of a vehicle, wherein the information relevant to the trajectory of the vehicle includes: a planned path of a user of the vehicle, a position and trajectory of the vehicle at a particular time, a map of a road network, a model of an illumination of the road network, a model of a terrain, and data from sensors;
program instructions to estimate the position of the vehicle at the particular time on the trajectory of the vehicle, using the data from the sensors;
program instructions to estimate an illumination of the trajectory of the vehicle, using the model of the illumination of the road network and the data from the sensors, wherein a threshold is employed for combined luminous flux of at least one headlight, streetlight, and ambient light at the particular time;
program instructions to determine the threshold is exceeded, wherein the exceeded threshold reveals there is not enough light present from the combined luminous flux of the at least one headlight, the streetlight, and the ambient light at the particular time;
program instructions to change a setting of the at least one headlight on the vehicle;
subsequent to changing the setting of the at least one headlight on the vehicle, program instructions to determine the threshold is exceeded; and
program instructions to alert the user of the vehicle when adjustments to the at least one headlight that are necessary to illuminate the trajectory of the vehicle exceed physical limitations of the at least one headlight, wherein the combined luminous flux of the at least one headlight, the streetlights, and the ambient light is not enough to illuminate the trajectory of the vehicle at the particular time.

16. The computer system of claim 15, wherein the sensors are selected from the group consisting of: visible light cameras, infrared cameras, lidar systems onboard the vehicle imaging a scene ahead of the vehicle, and geo-positioning systems.

17. The computer system of claim 15, further comprising:
program instructions, stored on the one or more computer readable storage devices, to alert the user of an illumination ahead of the trajectory of the vehicle;
program instructions, stored on the one or more computer readable storage devices, to recommend to the user to change the setting of the at least one headlight to a determined setting to provide lighting necessary to illuminate the trajectory of the vehicle;

program instructions, stored on the one or more computer readable storage devices, to receive an indication that the user rejects the recommendation; and program instructions, stored on the one or more computer readable storage devices, to emit through the at least one headlight, a same amount of light as before the recommendation.

18. The computer system of claim 15, further comprising:

program instructions, stored on the one or more computer readable storage devices, to alert the user of a sudden change of luminous flux of the at least one headlight; and program instructions, stored on the one or more computer readable storage devices, to provide an explanation, to the user, of a reason for the sudden change of the luminous flux of the at least one headlight.

19. The computer system of claim 15, wherein program instructions to alert the user of the vehicle comprise:

program instructions to alert the user when the combined luminous flux of the at least one headlight, the streetlights, and the ambient light does not meet the needs given by cognitive abilities of the user, abilities of any possible auto-pilot, insurance policies, and atmospheric conditions.

20. The computer system of claim 19, further comprising:

program instructions, stored on the one or more computer readable storage devices, to reduce a speed of the vehicle.

* * * * *